United States Patent [19]
Mio et al.

[11] Patent Number: 5,942,993
[45] Date of Patent: Aug. 24, 1999

[54] LANE CHANGE DETECTING SYSTEM FOR MOBILE BODIES AND MOBILE BODY DETECTING DEVICE EMPLOYED IN SUCH SYSTEM

[75] Inventors: Masahiro Mio; Keiji Aoki, both of Susono, Japan

[73] Assignee: Toyota Jidosha Kabushiki Kaisha, Japan

[21] Appl. No.: 08/917,614

[22] Filed: Aug. 26, 1997

[30] Foreign Application Priority Data

Aug. 28, 1996 [JP] Japan .................................. 8-227141

[51] Int. Cl.⁶ ...................................................... G08G 1/01
[52] U.S. Cl. ........................ 340/933; 340/910; 340/938; 340/942
[58] Field of Search ..................... 340/903, 436, 340/435, 910, 942, 943, 933, 935, 937, 938

[56] References Cited

U.S. PATENT DOCUMENTS

| | | | |
|---|---|---|---|
| 3,775,742 | 11/1973 | Koerner et al. | 340/938 |
| 4,143,264 | 3/1979 | Gilbert et al. | 250/210 |
| 4,348,652 | 9/1982 | Barnes et al. | 340/903 |
| 4,401,181 | 8/1983 | Schwarz | 180/168 |
| 4,926,170 | 5/1990 | Beggs et al. | 340/904 |
| 4,926,171 | 5/1990 | Kelley | 340/961 |
| 5,196,846 | 3/1993 | Brockelsby et al. | 340/933 |
| 5,318,143 | 6/1994 | Parker et al. | 180/168 |
| 5,347,456 | 9/1994 | Zhang et al. | 364/424.02 |
| 5,351,044 | 9/1994 | Mathur et al. | 340/901 |
| 5,369,591 | 11/1994 | Broxmeyer | 364/461 |
| 5,416,711 | 5/1995 | Gran et al. | 364/436 |
| 5,581,232 | 12/1996 | Tanaka et al. | 340/435 |
| 5,617,086 | 4/1997 | Klashinsky et al. | 340/907 |
| 5,661,472 | 8/1997 | Koshizawa | 340/901 |
| 5,673,039 | 9/1997 | Pietzsch et al. | 340/905 |
| 5,689,249 | 11/1997 | Sakamoto et al. | 340/901 |
| 5,708,427 | 1/1998 | Bush | 340/941 |
| 5,757,286 | 5/1998 | Jonsson et al. | 340/937 |
| 5,757,288 | 5/1998 | Dixon et al. | 340/941 |

FOREIGN PATENT DOCUMENTS

| | | |
|---|---|---|
| 4-73299 | 6/1992 | Japan . |
| 7-244796 | 9/1995 | Japan . |
| 8-314541 | 11/1996 | Japan . |

*Primary Examiner*—Jeffery A. Hofsass
*Assistant Examiner*—Toan N. Pham
*Attorney, Agent, or Firm*—Finnegan, Henderson, Farabow, Garrett & Dunner, L.L.P.

[57] ABSTRACT

A lane change detecting system includes an emission unit for emitting a predetermined signal, the emission unit being provided in a boundary between lanes of a road so that the predetermined signal emitted by the emission unit is affected by a mobile body which crosses the boundary between the lanes, a receiving unit which is provided in the boundary between the lanes for receiving the predetermined signal emitted by the emission unit and outputting a receiving signal corresponding to the received signal, and a determination unit for determining, based on a state of the receiving signal from the receiving unit, whether a mobile body crossed across the boundary between the lanes.

7 Claims, 14 Drawing Sheets

| VEHICLE ID | |
|---|---|
| VEHICLE SPEED (REAL/ESTIMATION) | |
| POSITION IN ZONE (REAL/ESTIMATION) | |
| TYPE OF VEHICLE | |
| ENTRANCE TIME | |
| CONTROL MODE | |
| PRECEDING VEHICLE ID | |
| FOLLOWING VEHICLE ID | | ary
LANE CHANGE DETECTING SYSTEM FOR MOBILE BODIES AND MOBILE BODY DETECTING DEVICE EMPLOYED IN SUCH SYSTEM

BACKGROUND OF THE INVENTION (1) Field of the Invention

The present invention generally relates to a lane change detecting system for mobile bodies such as vehicles, and more particularly to a lane change detecting system for detecting that a mobile body has gone across a boundary between adjacent lanes. In addition, the present invention relates to a mobile body detecting device employed in such system.

(2) Description of the Related Art

In recent years, an automated highway system (AHS) for vehicles has been proposed (see Japanese Laid Open Patent Application No. 8-314541). In the automated highway system, magnetic markers are placed along a lane of a road at predetermined intervals and a magnetic sensor provided in a vehicle which runs on the road detects the magnetic markers. Steering control of the vehicle is performed based on detecting signals from the magnetic sensor so that the vehicle does not go out of the lane. As a result, the vehicle is automatically controlled so as to run within the lane. In addition, vehicles which are running tandem communicate with each other by radio about information regarding the distance between vehicles (vehicle-vehicle communication). In each vehicle, the running speed is controlled based on the received information so that the distance between the vehicles is maintained at a predetermined value. Further, the vehicles which are automatically controlled as described above communicate by radio with communication terminals placed along the road about information regarding road conditions (vehicle-roadside communication). In each vehicle, based on the received information, the running speed is roughly controlled and driving control for avoiding danger is performed.

In such an automated highway system for the vehicles, for example, one of lanes of an express-highway is used as a special lane for the vehicles (hereinafter, referred to as automatic driving vehicles) which are automatically driven based on the information received in the vehicle-vehicle communication and the vehicle-roadside communication, or a special road (e.g., the express-highway) is provided for the automatically driven vehicles is provided. That is, the automatically driven vehicles and normal vehicles which are not automatically driven vehicles are not mixed in the same lane or the same express-highway.

However, it is difficult to provide the special lane for the automatically driven vehicles on the express-highway or the special road for the automatically driven vehicles. Thus, the automated highway system should be constructed under a condition in which the automatically driven vehicles and the normal vehicles can be mixed. In this case, the driving control of each of the automatically driven vehicle has to be based on the existence of the normal vehicles. That is, it is necessary to detect that normal vehicles have entered and exited the special lane for the automatically driven vehicles.

SUMMARY OF THE INVENTION

Accordingly, a general object of the present invention is to provide a novel and useful lane change detecting system for mobile vehicles in which the disadvantages of the aforementioned prior art are eliminated.

A specific object of the present invention is to provide a lane change detecting system for detecting that a mobile body such as a vehicle has moved from one of adjacent lanes to another.

The above objects of the present invention are achieved by a lane change detecting system comprising: emission means for emitting a predetermined signal, the emission means being provided in a boundary between lanes of a road so that the predetermined signal emitted by the emission means is affected by a mobile body which goes across the boundary between the lanes; receiving means which is provided in the boundary between the lane for receiving the predetermined signal emitted by the emission means and outputting a receiving signal corresponding to the received signal; and determination means for determining, based on a state of the receiving signal from the receiving means, whether a mobile body has gone across the boundary between the lanes.

In the above system, when a mobile body crosses the boundary between the lanes, the signal emitted by the emission means is affected by the mobile body. The state of the receiving signal output by the receiving means which receives the signal from the emission means is varied when the signal from the emission means is affected. Based on the variation of the state of the receiving signal, the determination means determines that a mobile body has crossed the boundary between the lanes.

According to the present invention, it can be detected that a mobile body such as a vehicle has moved from one adjacent lane to another.

The signal emitted by the emission means may be an optical signal such as a light beam, an electromagnetic signal or other types of signals.

The receiving means may be arranged so as to receive the signal reflected by a mobile body in the boundary between the lanes. Further, the receiving means may be arranged as to receive the signal when there is no mobile body in the boundary-between the lanes.

In order to be capable of determining a direction in which the mobile body has crossed the boundary between the lanes, the above system may be formed as follows. That is, the emission means has a plurality of emission units which are arranged so as to extend in a direction of a width of each of the lanes, each of the plurality of emission units emitting a signal, the receiving means has a plurality of receiving units each of which corresponds to one of the plurality of emission units, each of the plurality of receiving units receiving the signal from a corresponding one of the plurality of emission units and outputting a receiving signal corresponding to the received signal, and the determination means has direction determination means for determining, based on timing of state variations of receiving signals from the plurality of receiving units, a direction in which the mobile body has crossed the boundary between the lanes.

Another object of the present invention is to provide a mobile body detecting device employed in the above system.

The object of the present invention is achieved by a mobile body detecting device comprising: a housing having a first surface a second surface facing the first surface; signal emission means which is mounted in the housing for emitting a predetermined signal through the first surface; and receiving means which is mounted in the housing for outputting a receiving signal corresponding to a signal incident to a receiving surface of the receiving means, the receiving surface pointing outward through the second surface.

A plurality of mobile body detecting devices each of which is formed as described above are arranged at intervals in the boundary between the lanes. The first surface of each mobile body detecting device faces the second surface of an adjacent mobile body detecting device. In this state, the signal emitted by the signal emission means of a mobile body detecting device is incident to the receiving surface of the receiving means of an adjacent mobile body detecting device via the second surface. When a mobile body passes between the mobile body detecting device and the adjacent mobile body detecting device, the signal emitted by the mobile body detecting device is temporarily affected by the mobile body. As a result, the state of the receiving signal output by the receiving means of the adjacent mobile body detecting device is varied. It can be determined, based on the variation of the state of the receiving signal, that a mobile body has crossed the boundary between the lanes.

In order to be capable of determining a direction in which a mobile body has crossed the boundary between the lanes, the above mobile body detecting device may be formed as follows. The signal emission means has a plurality of signal output units which output signal beams arranged in parallel to each other, and the signal receiving means has a plurality of receiving units, each of the plurality of receiving units having a receiving surface which points outward through the second surface.

In this case, each of the mobile body detecting devices are arranged on the road so that the plurality of signal output units and the receiving units extend in a width direction of the lanes.

BRIEF DESCRIPTION OF THE DRAWINGS

Other objects, features and advantages of the present invention will be apparent from the following description when read in conjunction with the accompanying drawings, in which.

DESCRIPTION OF THE PREFERRED EMBODIMENTS

A description will be given of embodiments of the present invention.

Figure 1:
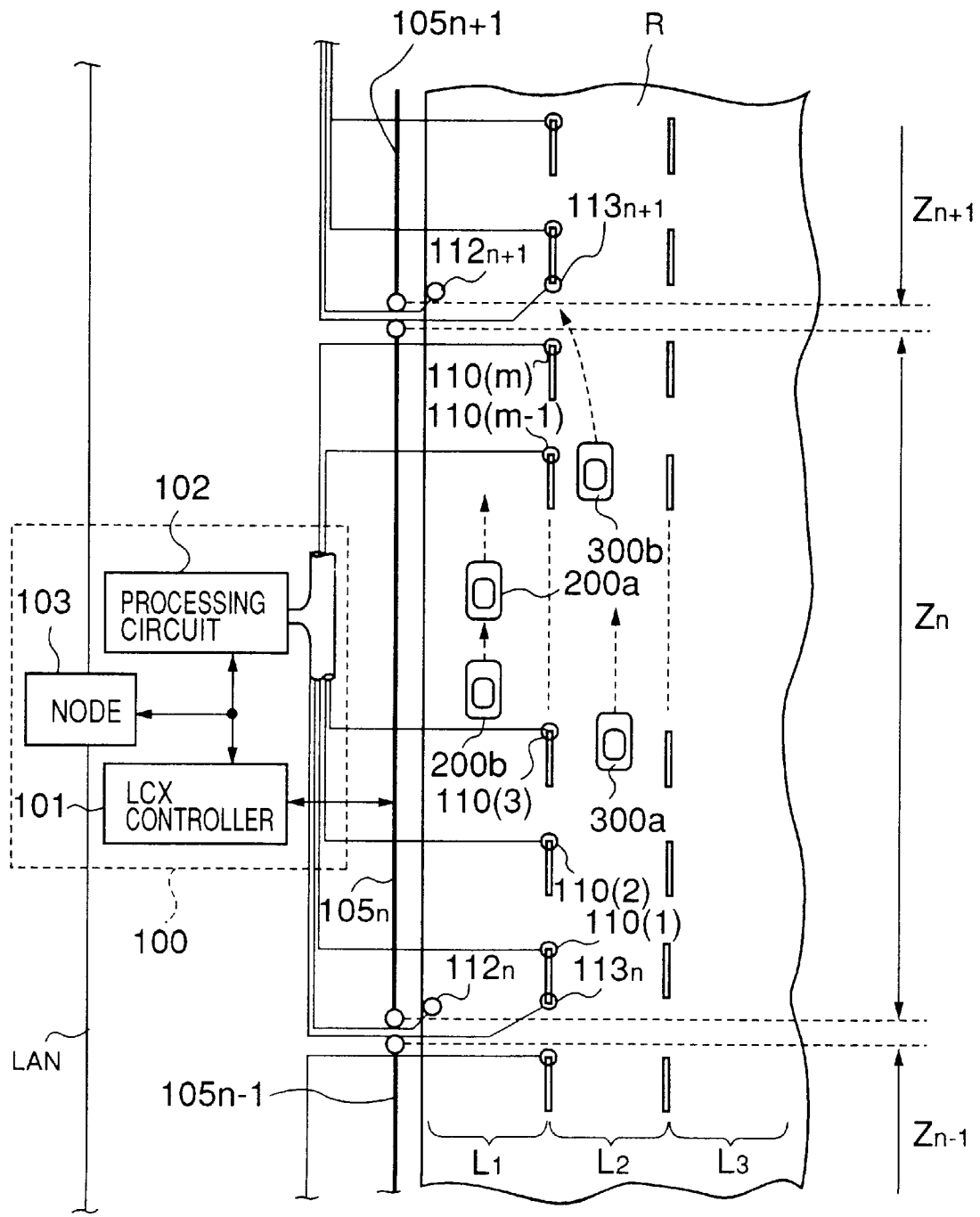
FIG. 1 is a diagram illustrating an automated highway system to which a lane change detecting system for mobile bodies according to present invention is applied.

The automated highway system is formed as shown in FIG. 1. Referring to FIG. 1, a road R (e.g., an express-highway) has lanes L1, L2 and L3 extending in one running direction. The lane L1 which is located at the outermost position (i.e., the leftmost lane) is used as a special lane in which automatically driven vehicles $200a$ and $200b$ can run. Normal vehicles (which are not automatically driven vehicles) $300a$ and $300b$ can run in all the lanes L1, L2 and L3. Hereinafter, the lane L1 is referred to as the special lane L1.

Leakage coaxial cables (hereinafter, referred to as LCX (s)) ..., $105_{n-1}$, $105_n$, $105_{n+1}$, ... are continuously arranged along a roadside of the road R. Each of the LCXs $105_n$ has a constant length (e.g., 500 meters) and is used for communication (the vehicle-roadside communication) to each of the automatically driven vehicles $200a$ and $200b$ which are running in the special lane L1. A zone of a LCX $105_n$ is defined as a control zone $Z_n$ for the-automatically driven vehicles.

In each control zone $Z_n$, lane change sensors 110(1), 110(2), ..., 110(m) are arranged at constant intervals (e.g., about 20 meters) and placed in the boundary between the special lane L1 and the lane L2 adjacent to the special lane L1 on the road R. At a start position of each control zone $Z_n$, a light emission unit $112_n$ and a photo detecting unit $113_n$ are placed. The light emission unit $112_n$ and the photo detecting unit $113_n$ are arranged at a distance equal to the width of the special lane L1 in a direction perpendicular to the width of the special lane L1. The light emission unit $112_n$ and the photo detecting unit $113_n$ form a vehicle entrance sensor for detecting vehicles which moves from the previous control zone $Z_{n-1}$ to the control zone $Z_n$ in the special lane L1.

A communication terminal 100 corresponding to each control zone $Z_n$ is placed on the roadside. The roadside communication terminal 100 has an LCX controller 101, a processing circuit 102 and a node unit 103. The LCX controller 101 controls the communication with the automatically driven vehicles $200a$ and $200b$ via the LCX $105_n$.

The processing circuit 102 supplies power to the respective lane change sensors 110(1), 110(2), . . . , 102(m) and the vehicle entrance sensor (the light emission unit $112_n$ and the photo detection unit $113_n$) and processes detecting signals from the respective sensors. The node unit 103 is connected to a control station and other node units via a LAN so that signals (information) from the LCX controller 101 and the processing circuit 102 are transmitted to the control station via the LAN. In addition, information from the control station is supplied to the LCX controller 101 and the processing circuit 102 via the LAN and the node unit 103.

Figure 2:
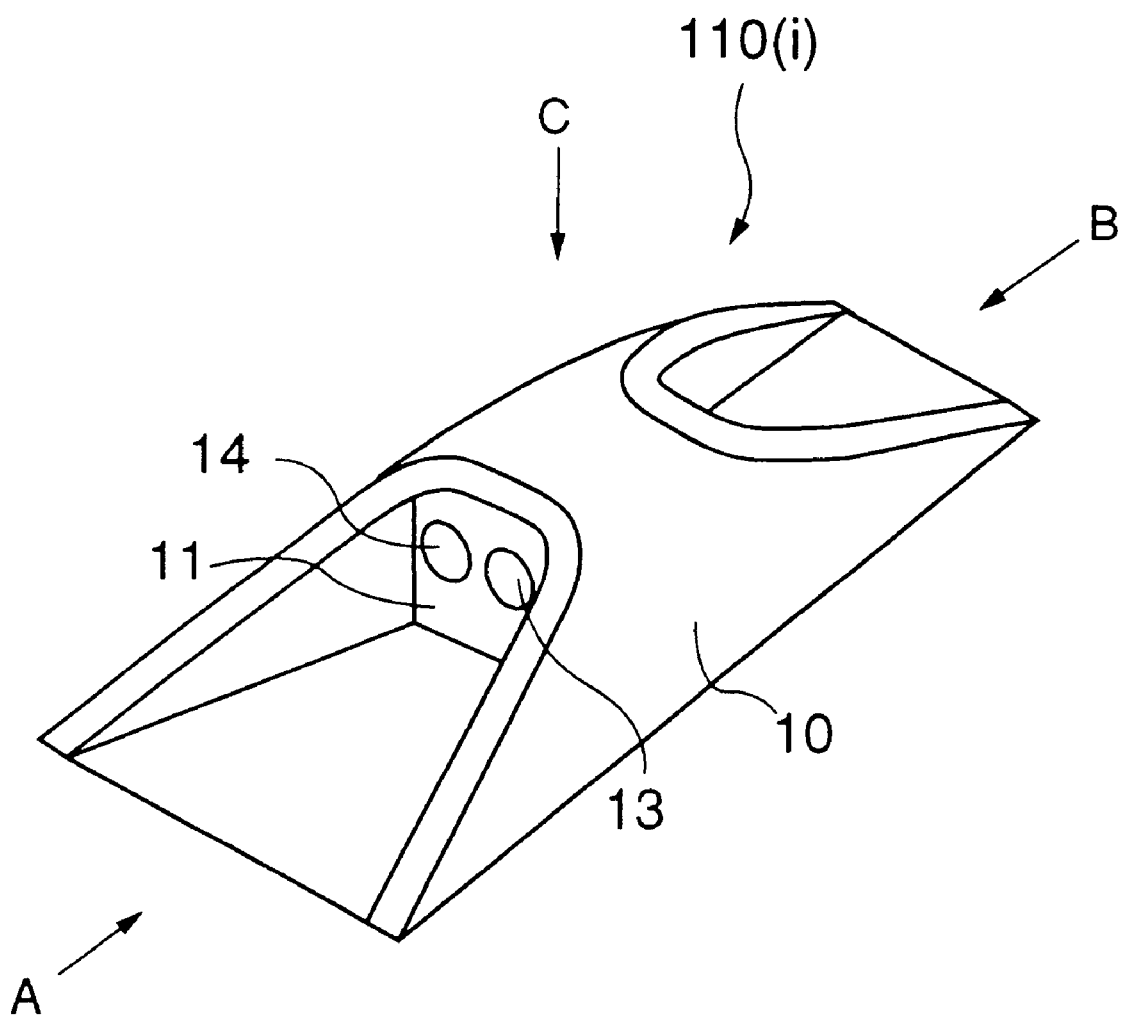
FIG. 2 is a perspective view showing the exterior of a lane change sensor.
Figure 3:
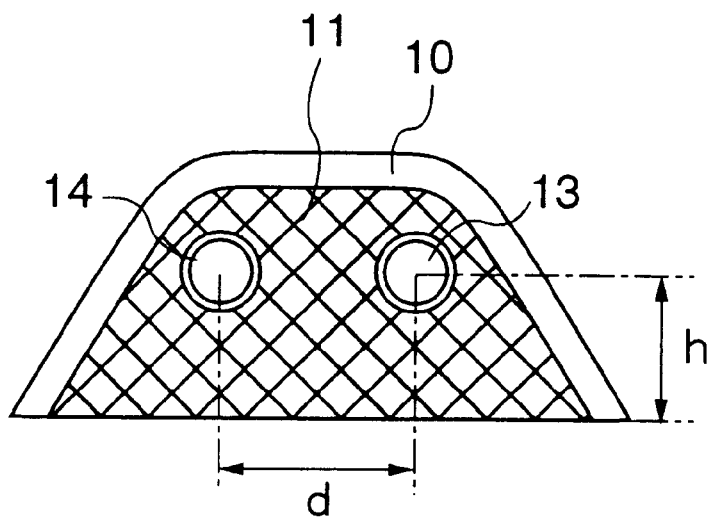
FIG. 3 is a view of the lane change sensor from the arrow A shown in FIG. 2.
Figure 4:
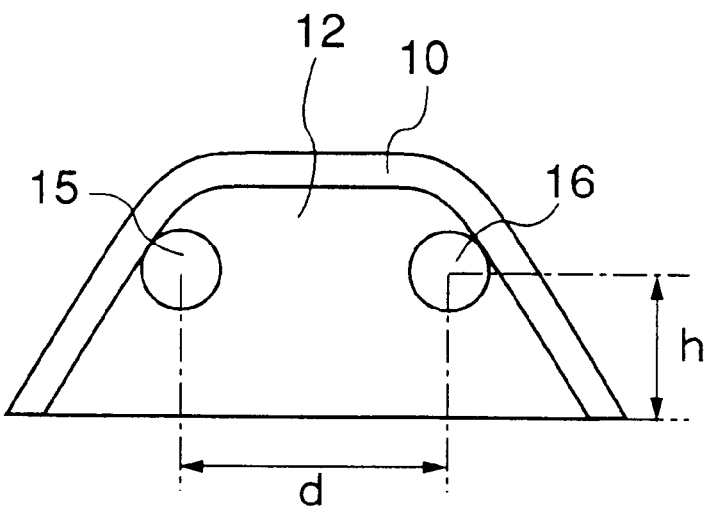
FIG. 4 is a view of the lane change sensor from the arrow B shown in FIG. 2.
Figure 5:
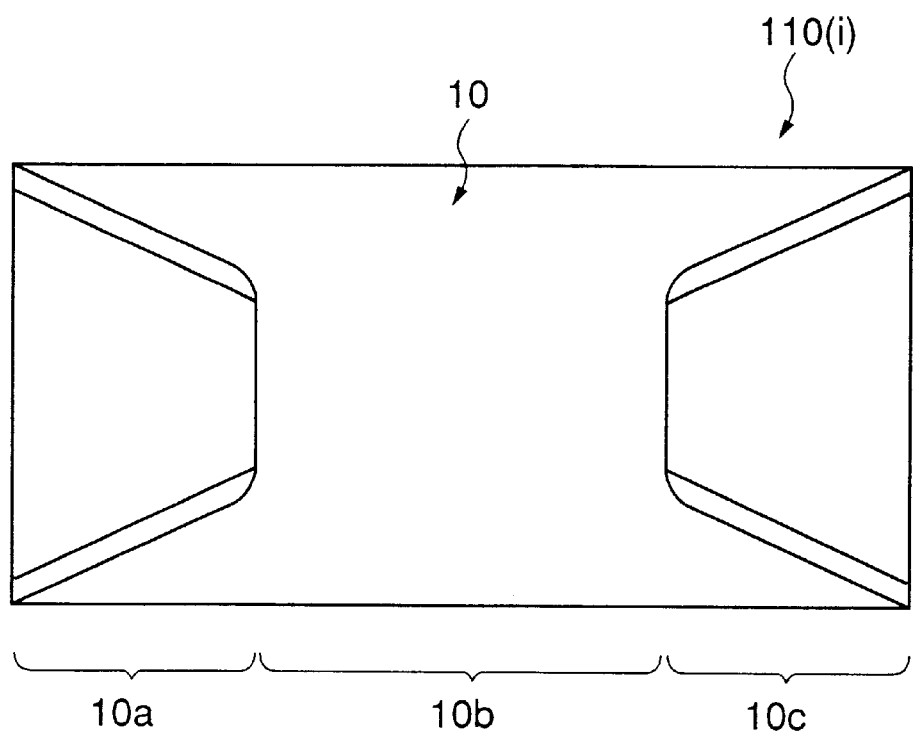
FIG. 5 is a view of the lane change sensor from the arrow C shown in FIG. 2.

Each of the lane change sensors 110(1), 110(2), . . . , 110(m) is formed as shown in FIGS. 2 through FIG. 5. FIG. 2 shows an exterior view of a lane change sensor, FIG. 3 is a view of the lane change sensor from in the direction of the arrow A shown in FIG. 2, FIG. 4 is a view of the lane change sensor in the direction of the arrow B shown in FIG. 2, and FIG. 5 is a view of the lane change sensor in the direction of the arrow C shown in FIG. 2.

As shown in FIG. 2, the height of a middle part of a housing 10 of the lane change sensor 110(i) is greater than the ends and the height of the housing 10 gradually decreases toward the front and rear ends thereof. That is, the housing 10 is formed, as shown in FIG. 5, of a body portion 10b which is in the middle of the housing 10 and inclination portions 10a and 10c which are respectively at the rear and front ends of the body portion 10b. In each of the inclination portions 10a and 10c, a space is formed between side walls in which upper edges thereof are inclined. A space is formed in the body portion 10b as will be described later. The body portion 10b has a rear partition wall 11 at the side of the inclination portion 10a and a front partition wall 12 at the side of the inclination portion 10c.

A reflector plate by which light is finely irregularly reflected is adhered to a surface of the rear partition wall 11, as shown in FIG. 3. Photo detecting windows 13 and 14 are formed in the rear partition wall 11. The photo detecting windows 13 and 14 are positioned apart at a distance (d) in a direction parallel to the base of the housing 10 and positioned at a height (h) from the base of the housing 10. Light emission windows 15 and 16 are formed in the front partition wall 12 as shown in FIG. 4. The light emission windows 15 and 16 are positioned apart at a distance (d) and positioned at a height (h) in the same manner as the photo detecting windows 13 and 14.

The housing 10 is made of aluminum-castings. Since the lane change sensor is placed on the road R, the strength of the housing 10 of the lane change sensor is designed so as withstand the weight of each of the vehicles and the shape of the housing 10 is designed so as to not interfere with running of the vehicles. The height (h) from the base surface of the housing at which the photo detecting windows 13 and 14 and the light emission windows 15 and 16 are positioned is determined based on factors such as the depth of snow on the road R (e.g., the express-highway).

A space is formed in the body portion 10b of the housing 10. An optical system is provided in the space of the body portion 10b, as shown in FIG. 6.

Figure 6:
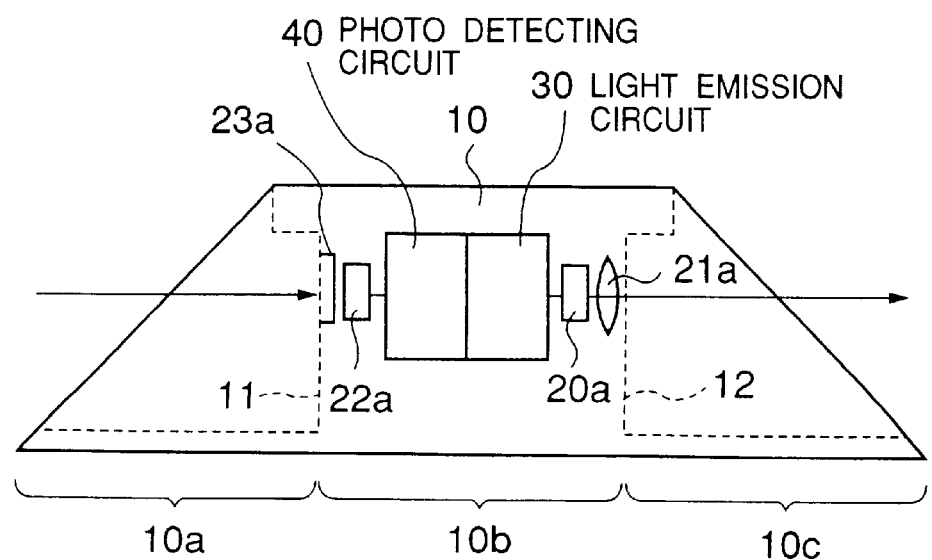
FIG. 6 is a diagram illustrating an interior structure of the lane change sensor.

Referring to FIG. 6, the photo detecting window 13 of the rear partition wall 11 of the body portion 11b is covered with a filter 23a which cuts off visible light components. A photo diode 22a (a photo detecting unit) is provided so as to face the photo detecting windows 13 via the filter 23a. A filter (23b) and a photo diode (22b) are provided with respect to the photo detecting window 14 although they are not shown in FIG. 6. The photo diodes 22a (and 22b) are connected to a photo detecting circuit 40.

An optical unit 21a including a lens is provided so as to face the light emission window 15 of the front partition wall 12 of the body portion 10b. Further, a laser diode 20a (a light emission unit) which emits a laser beam having a predetermined wave length is provided so as to face the optical unit 21a. The laser beam emitted by the laser diode 20a is condensed by the optical unit 21a and emitted through the light emission window 15. An optical unit (21b) and a laser diode (20b) are provided with respect to the light emission window 16 although they are not shown in FIG. 6. The respective laser diodes 20a (and 20b) are connected to a light emission circuit 30.

The laser diode 20a, the optical unit 21a and the photo diode 22a are aligned so that an optical axis of the laser beam emitted through the light emission window 15 is, as much as possible, on a line normal to the center of the detecting surface of the photo diode 22a. The laser diode 20b, the optical unit 21b and the photo diode 22b are aligned so that an optical axis of the emitted laser beam is, as much as possible, on the a line normal to the center of the detecting surface of the photo diode 22b.

The lane change sensors 110(1), 110(2), . . . , 110(m) each of which has the structure described above are arranged on the road R at predetermined intervals so that the rear partition wall 11 of each of the lane change sensors points toward the upstream traffic (the downward direction in FIG. 1) and the front partition wall 12 of each of the lane change sensors points toward the downstream traffic (the upward direction in FIG. 1). The alignment of the lane change sensors 110(1), 110(2), . . . , 110(m) is adjustable. As a result, the laser beams emitted through the light emission windows 15 and 16 of each lane change sensor are arranged in a direction parallel to the width of the lane and projected on the detecting surfaces of the photo diodes 22a and 22b of the adjacent lane change sensor.

Figure 7:
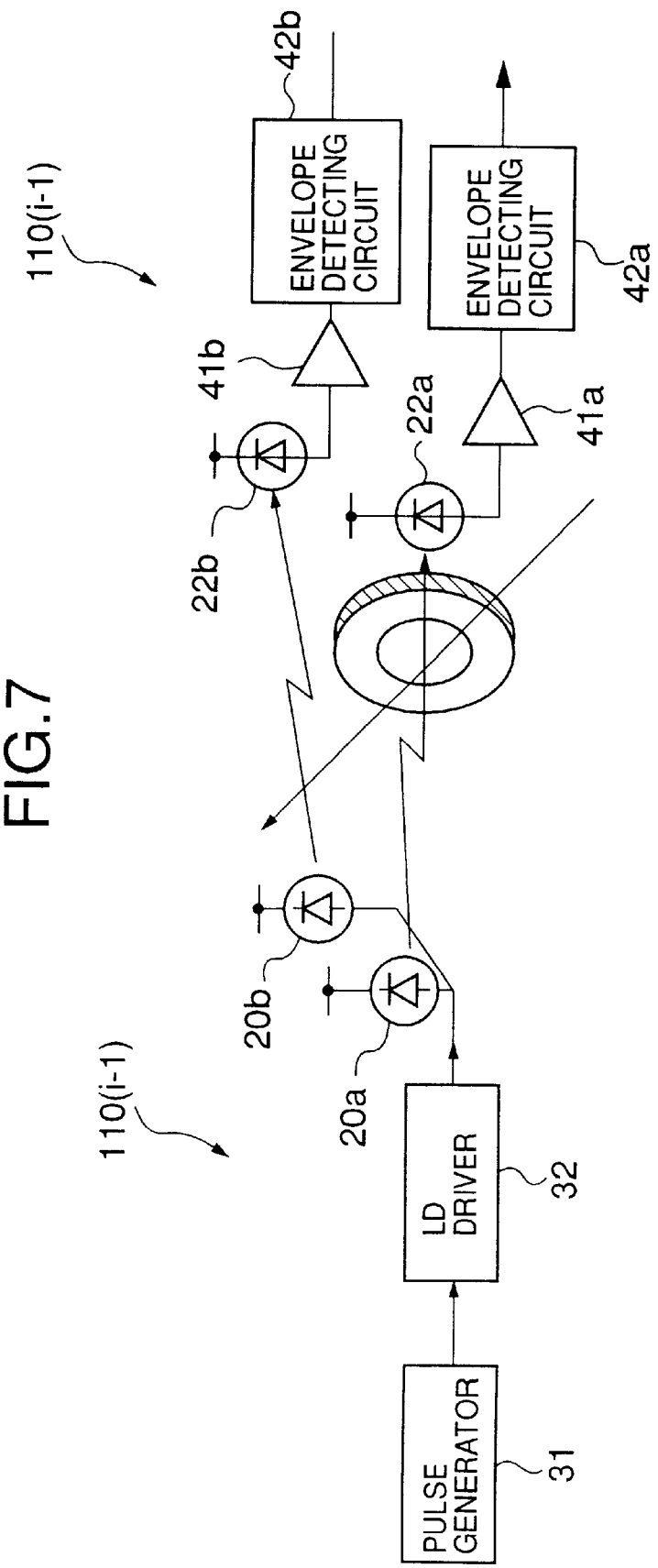
FIG. 7 is a diagram illustrating an example of formation of a photo detecting circuit and a light emission circuit both of which are mounted in the lane change sensor.

The light emission circuit 30 and the photo detecting circuit 40 are formed as shown in FIG. 7. In FIG. 7, the light emission circuit 30 of the line change sensor 110(i−1) and the photo detecting circuit 40 of the lane change sensor 110(i) which is adjacent to the lane change sensor 110(i−1) on the downstream side of the lane change sensor 110(i−1) are indicated.

Referring to FIG. 7, the light emission circuit 30 has a pulse generator 31 and a driver circuit 32. The pulse generator 31 outputs a predetermined pulse signal. The driver circuit 32 drives the respective laser diodes 20a and 20b in accordance with the pulse signal supplied from the pulse generator 31. As a result, the respective laser diodes 20a and 20b emit pulse-modulated laser beams. Due to such pulse modulation of the respective laser diodes 20a and 20b, the laser beams are prevented from being affected by DC (direct current) noise and the required power of each of the laser diodes 20a and 20b can be reduced.

The photo detecting circuit 40 has AC amplifiers 41a and 41b and envelope detecting circuits 42a and 42b. The AC amplifiers 41a and 41b respectively amplify photo detecting signals output by the photo diodes 22a and 22b. The envelope detecting circuits 42a and 42b respectively detect envelopes of the photo detecting signals supplied from the AC amplifiers 41a and 41b and output envelope signals.

The output signals (the envelope signals) from the respective envelope detecting circuits 42a and 42b are supplied to the processing circuit 102 of the roadside communication terminal 100. The processing circuit 102 has a determination circuit which determines, based on the output signals from the envelope detecting circuits 42a and 42b of each lane change sensor, whether a vehicle has entered the special lane L1 for the automatically driven vehicles and whether a vehicle has moved out of the special lane L1.

Figure 8:
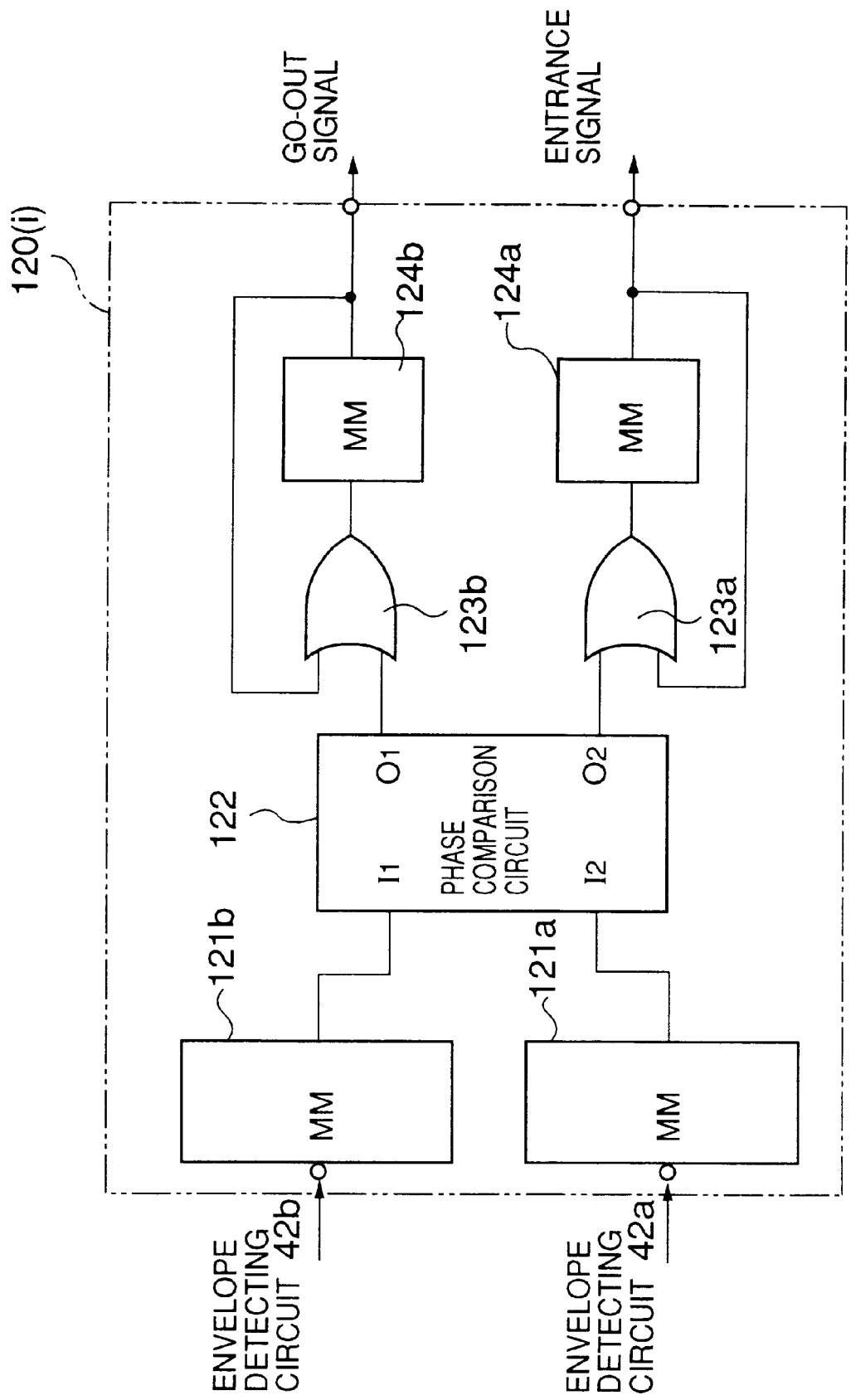
FIG. 8 is a block diagram illustrating a determination circuit for determining a direction in which a vehicle crossed the boundary between adjacent lanes.

The determination circuit is formed as shown in FIG. 8.

Referring to FIG. 8, the determination circuit 120(i) has a monostable multivibrators 121a and 121b, a phase comparison circuit 122, OR gates 123a and 123b, and monostable multivibrators 124a and 124b. The monostable multivibrators 121a and 121b are respectively activated by a falling of the output signals of the envelope detecting circuits 42a and 42b so as to output signals each of which has a predetermined pulse width. The phase comparison circuit 122 compares the phases of a rising of the signals output by the monostable multivibrators 121a and 121b with each other. When the phase of the rising of the signal from the monostable multivibrators 121a (an input port I2) is prior to the phase of the rising of the signal from the monostable multivibrators 121b (an input port I1), a detecting pulse is output from an output port O2 of the phase comparison circuit 122. On the other hand, when the relationship between the phases of the rising of the signals from the monostable multivibrators 121a and 121b is opposite, the detecting pulse is output from an output port O1 of the phase comparison circuit 122.

The detecting pulse from the output port O1 of the phase comparison circuit 122 is supplied to the monostable multivibrator 124b via the OR gate 123b. An output signal of the monostable multivibrator 124b is fed back to an input terminal of the OR gate 123b. The detecting pulse from the output port O2 of the phase comparison circuit 122 is supplied to the monostable multivibrator 124a via the OR gate 123a. An output signal of the monostable multivibrator 124a is fed back to an input terminal of the OR gate 123a. The output signal of the monostable multivibrator 124a is an entrance signal representing that a vehicle has entered the special lane L1 for the automatically driven vehicles. The output signal of the monostable multivibrator 124b is an exit (a go-out) signal representing that a vehicle has exited from the special lane L1.

Each of the monostable multivibrators 124a and 124b is adjusted so that the pulse width of the output signal corresponds to a time required for a general vehicle to pass through the boundary between the special lane L1 and the lane L2 adjacent to the special lane L1.

A description will now be given, with reference to the timing charts shown in FIGS. 9 and 10, of operations of the light emission circuit 30 and the photo detecting circuit 40 of the lane change sensor and the determination circuit provided in the processing circuit 101 of the roadside communication terminal 100.

Figure 9:
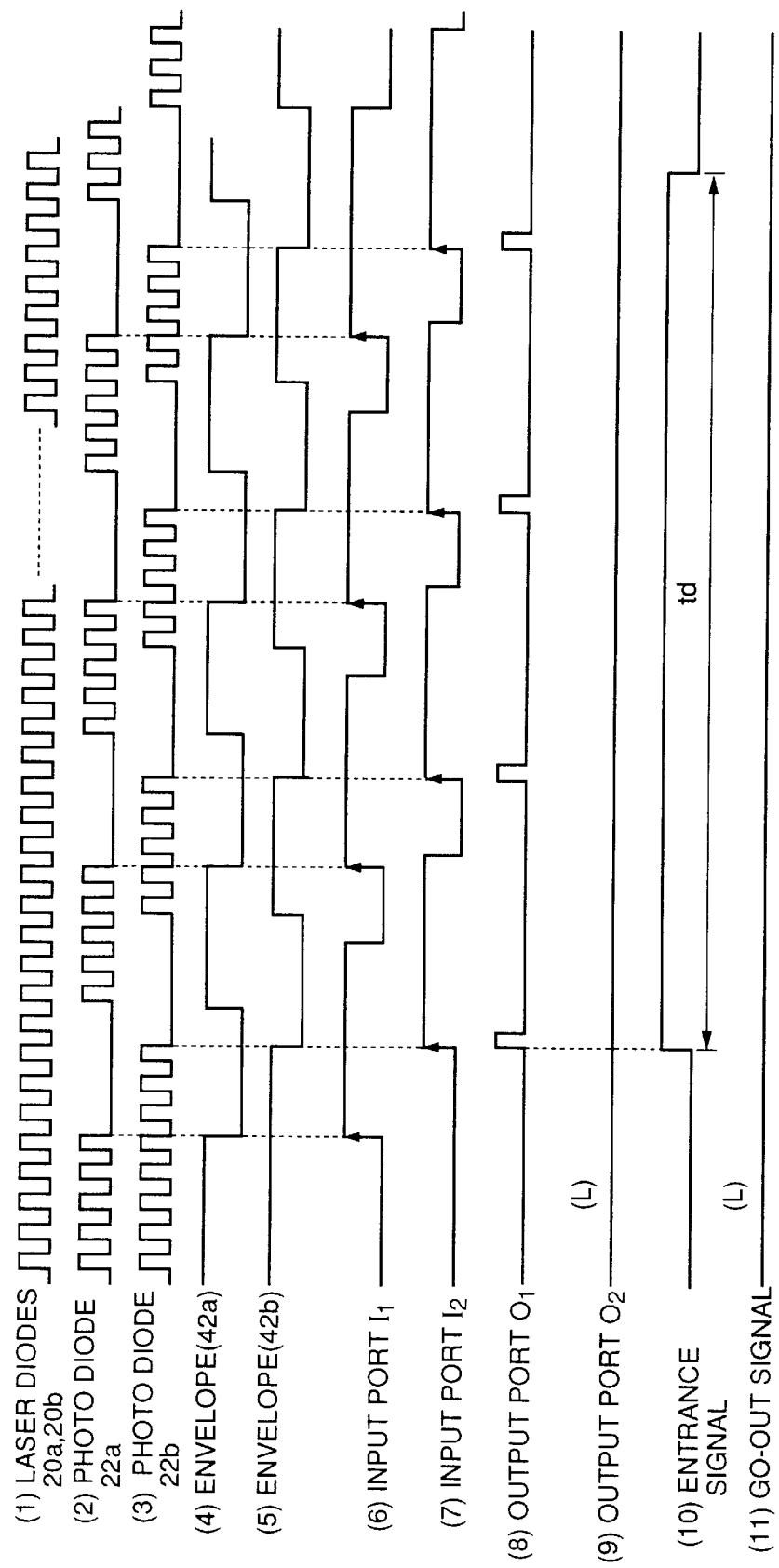
FIG. 9 is a timing chart illustrating operations of the determination circuit in a case where a vehicle moves from a lane L2 to a special lane L1 for automatically driven vehicles.
Figure 10:
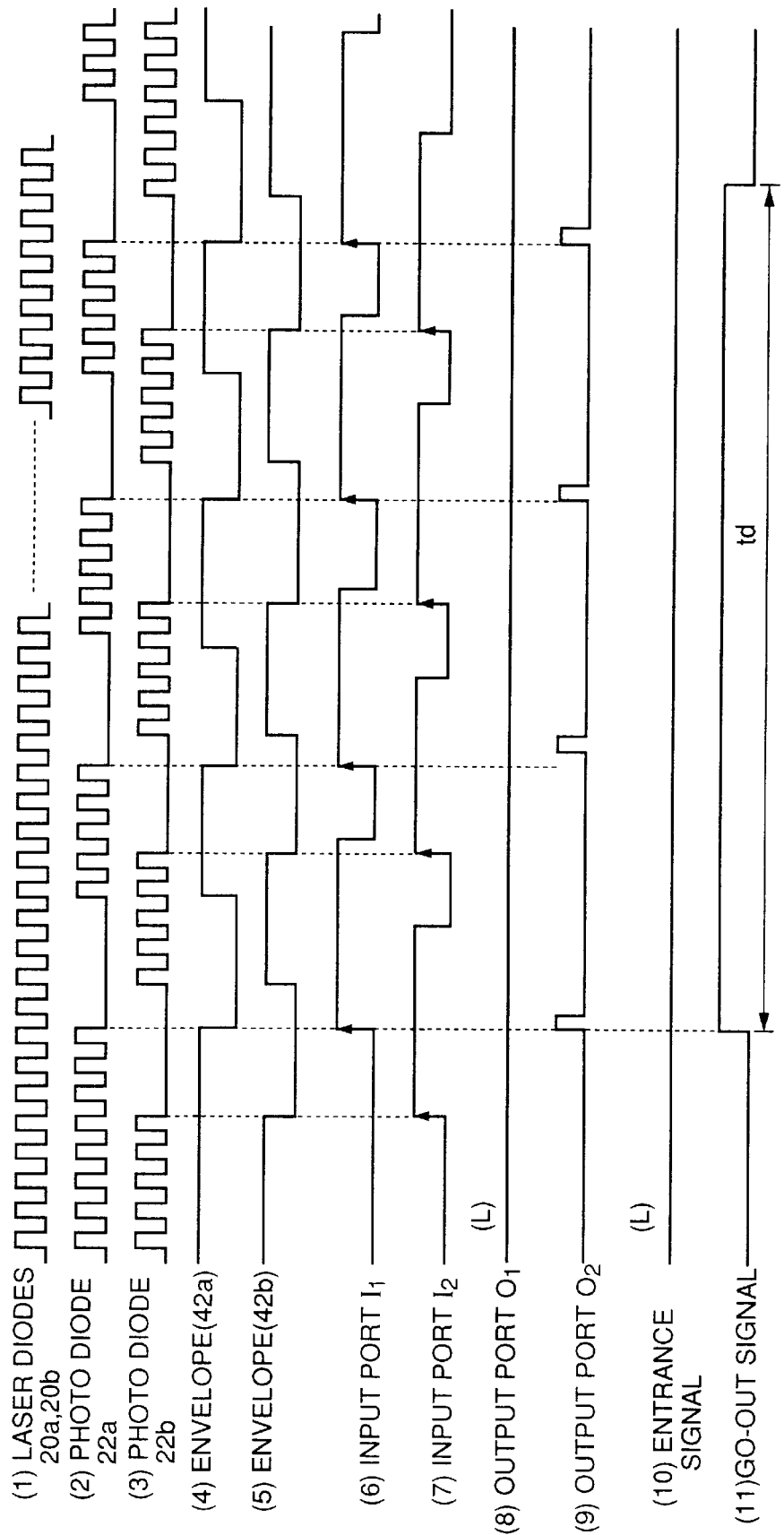
FIG. 10 is a timing chart illustrating operations of the determination circuit in a case where a vehicle exits from the special lane L1 for the automatically driven vehicle to the lane L1.

Normally, pulse laser beams from the laser diodes 20a and 20b (see (1) in FIG. 9 and (1) in FIG. 10) which are pulse-driven by the light emission circuit 30 of the lane change sensor 110(i–1) are respectively incident on the photo diodes 22a and 22b of the lane change sensor 110(i) located on the downstream side of the lane change sensor 110(i). At this time, the output signals of the respective envelope detecting circuits 42a and 42b are not varied. As a result, the phase comparison circuit 122 of the determination circuit 120(i) does not output the detecting pulse, so that the exit signal and the entrance signal are maintained at a low level (L).

In this state, when a vehicle moves between the lane change sensors 110(i–1) and 100(i) from the lane L2 to the special lane L1, the respective signals are varied as shown in FIG. 9. When a vehicle having four wheels goes across the boundary between the lanes L1 and L2, the laser beams emitted from the laser diodes 20a and 20b may be interrupted four times, at most, by the wheels. This case is shown in FIG. 9.

In this case, each of the wheels interrupts the laser beam at the side of the lane L2 and then interrupts the laser beam at the side of the lane L1. As a result, each of the photo diodes 22a and 22b which receives the laser beam outputs the pulse signal (see (2) and (3) in FIG. 9) which is interrupted for a predetermined time every time a wheel interrupts the laser beam. A time at which the output signal from the photo diode 22a is interrupted is prior to a time at which the output signal from the photo diode 22b interrupted. As a result, a time at which the output signal of the envelope detecting circuit 42a falls is prior to a time at which the output signal of the envelope detecting circuit 42b falls (see (4) and (5) in FIG. 9).

A time at which the signal input from the monostable multivibrator 121a to the input port I2 of the phase comparison circuit 122 rises is prior to a time at which the signal input from the monostable multivibrator 121b to the input port I1 of the phase comparison circuit 122 rises (see (6) and (7) in FIG. 9). Thus, the phase comparison circuit 122 outputs the pulse signal as the comparison result from the output port O1 every time the phases of the rising of the respective input signals are compared with each other (see (8) in FIG. 9). At this time, the output port O2 of the phase comparison circuit 122 is maintained at the low level (L) (see (9) in FIG. 9).

The phase comparison circuit 122 outputs the pulse signal from the output port O1 every time each wheel goes across the two laser beams. The monostable multivibrator 124a is set by the pulse signal output from the output port O1 of the phase comparison circuit 122, so that the entrance signal having a predetermined pulse width is output from the monostable multivibrator 124a (see (10) in FIG. 9). Immediately after the entrance signal rises, the entrance signal is fed back to the OR gate 123a. After this, the pulse signal output from the output port O1 of the phase comparison circuit 122 is interrupted by the OR gate 123a every time each wheel goes across the two laser beams. The entrance signal output from the monostable multivibrator 124a has a pulse width $t_d$ corresponding to a time period which is required for a normal car to pass through the boundary between the special lane L1 and the lane L2 adjacent to the special lane L1. Thus, the pulse signals which are successively output from the output port O1 do not affect the monostable multivibrator 124a.

In the above case, the signal output as the exit signal from the other monostable multivibrator 124b is maintained at a low level (L).

On the other hand, when a vehicle passes between the lane change sensors 110(i–1) and 110(i) and moves from the special lane L1 to the lane L2, the respective signals are varied as shown in FIG. 10.

In this case, the timing relationship between the output signals from the respective photo diodes 22a and 22b (see (2) and (3) in FIG. 10), the timing relationship between the output signals from the envelope detecting circuits 42a and 42b (see (4) and (5) in FIG. 10), and the relationships between the phases at which the signals input to the input ports I1 and I2 of the phase comparison circuit 122 rise (see (6) and (7) in FIG. 10) and are respectively inverse to corresponding relationships in the case shown in FIG. 9. As a result, the pulse signal is output from the output port O2 of the phase comparison circuit 122 every time each wheel goes across the two laser beams (see (9) in FIG. 10).

The monostable multivibrator 124b is set by the pulse signal output from the output port O2 of the phase comparison circuit 122, so that the exit signal having a predetermined pulse width is output from the monostable multivibrator 124b (see (11) in FIG. 10). At this time, the signal from the output port O1 of the phase comparison circuit 122 is maintained at the low level (L) (see (8) in FIG. 10).

In the above system, when the entrance signal and the exit signal are output from the determination circuit 120(i), the processing circuit 102 of the roadside communication terminal 100 recognizes that a vehicle has moved from the lane L2 to the special lane L1 and from the special lane L1 to the lane L2. The recognized information is supplied to the control station via the node unit 103 and the LAN. The control station transmits control information based on the received information to the respective roadside communication terminals via the LAN. In each of the roadside communication terminals, the LCX controller 101 communicates via the LCX $105_n$ with the automatically driven vehicles 200a and 200b, running in the special lane L1, about the control information (the vehicle-roadside communication).

In the above embodiment, the four wheels of the vehicle separately go across the laser beams. The four wheels of the vehicle may concurrently go across the laser beams (the number of times that the laser beams are interrupted by the four wheels is less than four). Even if this case occurs, since each of the monostable multivibrators 124a and 124b is adjusted so as to output the signal having the pulse width $t_d$ corresponding to the period of time which is required for a normal vehicle to pass through the boundary between the special lane L1 and the lane L2 adjacent thereto, the determination circuit 120 (i) can operate without problem.

In addition, when a vehicle goes over a lane change sensor and passes through the boundary between the special lane L1 and the lane 2 adjacent thereto, the entrance signals or the exit signals are obtained based on the signals from the lane change sensor and another lane change sensor positioned at the upstream side of the lane change sensor. In this case, for example, when the entrance signal or the exit signal is output from the determination circuit corresponding to a lane change sensor, the output signal from another lane sensor positioned at the upstream side of the lane sensor may be masked.

Further, in the above embodiment, the reflector plate is adhered to the surface of the rear partition wall 11 of the housing 10 of each lane change sensor. Thus, a driver of each vehicle running in the special lane L1 and the lane L2 at night can visually recognize the boundary between the special lane L1 and the lane L2.

Running states of vehicles which are running in the special lane L1 are managed using the entrance signal and the exit signal which represent that the vehicle moves from the lane L2 to the special lane L1 and vice versa. A management system for managing the running states of the vehicles is formed as follows.

Figure 11:
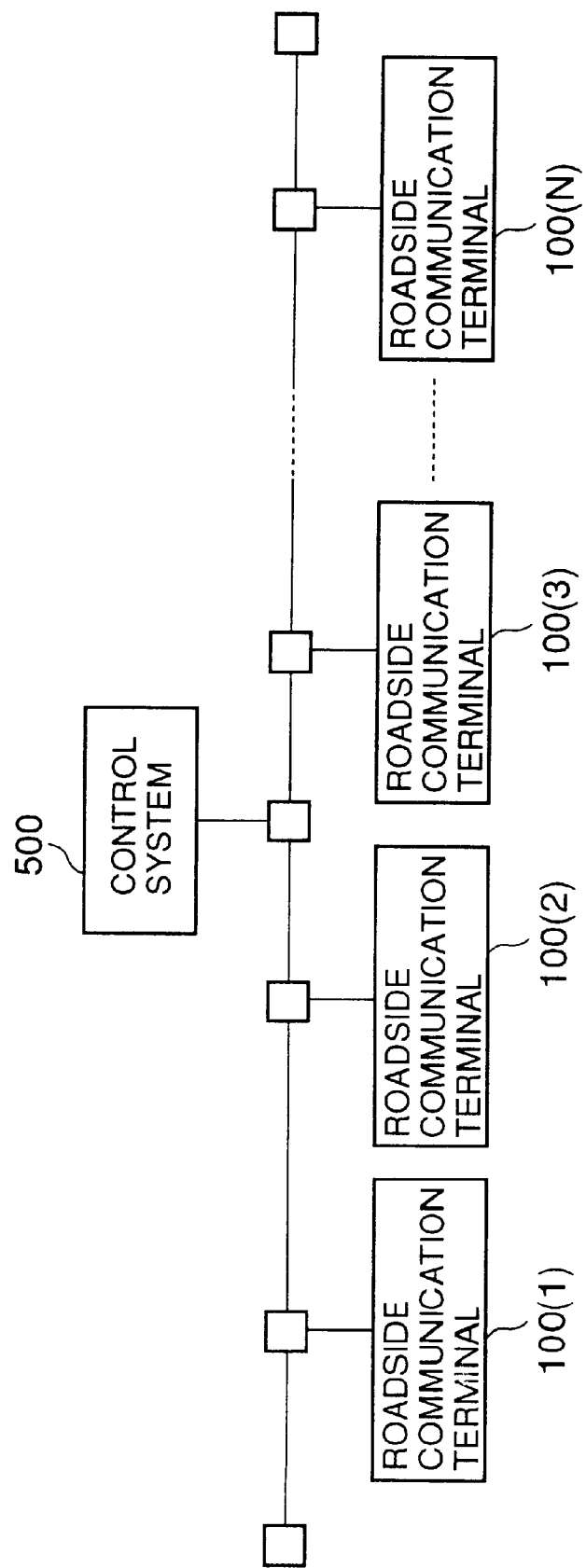
FIG. 11 is a block diagram illustrating a system for managing running conditions of vehicles which are running in the special lane for the automatically driven vehicles.

In a case where the special lane L1 is set on an express-highway R, the control station which controls N roadside communication terminals provided on the roadside between interchanges of the express-highway is established. As shown in FIG. 11, a control system 500 is connected, by a LAN, to N roadside communication terminals 100(1), 100(2), . . . 100(N) which should be controlled. Each of the roadside communication terminals is formed as shown in FIG. 1. The roadside communication terminal 100(n) is provided for the zone $Z_n$ of the special-lane L1.

Each of the automatically driven vehicles 200a and 200b has at least three functions: a function for communicating with the roadside communication terminal 100(n) via the LCX $105_n$ (the vehicle-roadside communication), a function for communicating with other vehicles which are running in tandem before and behind the vehicle (the vehicle-vehicle communication), and a function for controlling running state (the speed, the distance between the vehicles and the like) based on information obtained by the vehicle-roadside communication and the vehicle-vehicle communication. The normal vehicles 300a and 300b are not equipped for such functions.

The control system 500 has control units corresponding to the respective control zones. Each of the control units executes processes in accordance with procedures as shown in FIG. 12 through FIG. 16.

Figure 12:
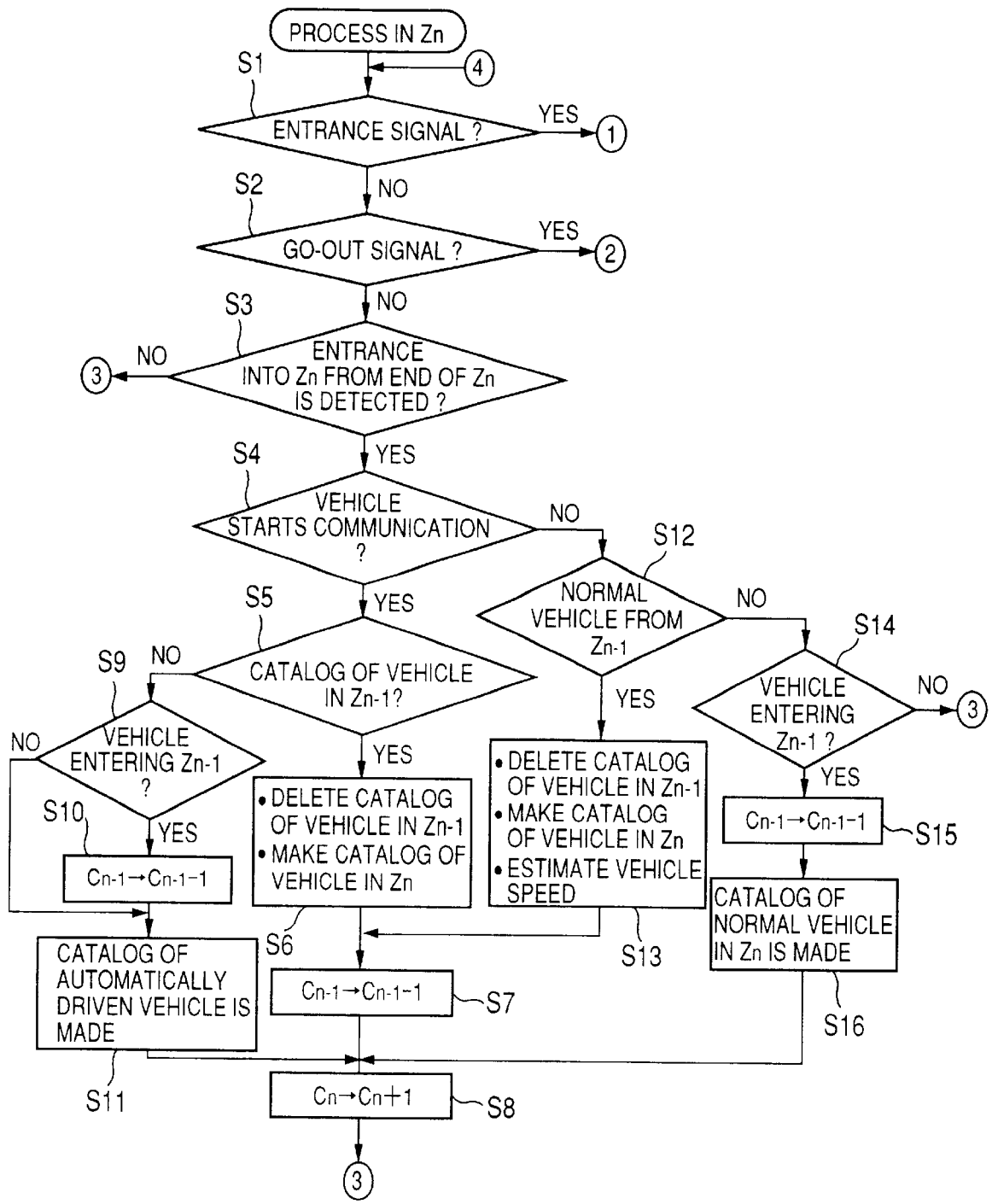
FIG. 12 is a flowchart (No.1) illustrating a procedure of a process in a control unit corresponding to each zone of the special lane for the automatically driven vehicles.

Referring to FIG. 12, the processing circuit 102 of the roadside communication terminal 100(n) corresponding to the zone $Z_n$ is monitored as to whether it has output the entrance signal (a signal representing that a vehicle moves from the lane L2 to the special lane L1) (S1). The processing circuit 102 is monitored as to whether it has output the exit signal (a signal representing that a vehicle moves from the special lane L2 to the lane L2) (S2). The vehicle entrance sensor is monitored as to whether it (the light emission unit $112_n$ and the photo detecting unit $113_n$) has detected if a vehicle has moved from the previous zone $Z_{n-1}$ to the zone $Z_n$ (S3).

Figure 13:
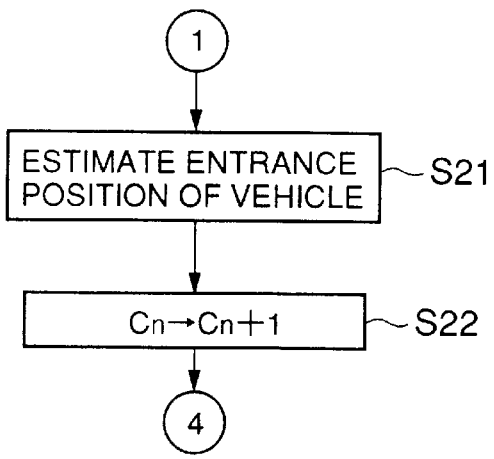
FIG. 13 is a flowchart (No.2) illustrating a procedure of a process in the control unit corresponding to each zone of the special lane for the automatically driven vehicles.

If it is determined that the entrance signal has been output (Yes in S1), a process is performed in accordance with a procedure as shown in FIG. 13. That is, a position at which a vehicle has entered the special lane L1 is estimated based on a position at which a lane change sensor 110(i) detecting the entrance of the vehicle to the special lane L1 is provided in the zone $Z_n$ (S21). A counting value of a counter $C_n$ is incremented by +1 (S22). The count value of the counter $C_n$ represents the number of vehicles in the zone $Z_n$. As a result of the above process, the control unit corresponding to the zone $Z_n$ recognizes that a vehicle from the lane L2 has entered the zone $Z_n$ and the number of vehicles in the zone $Z_n$ has been increased by one. At this time, the control unit does not recognize which type of vehicle, e.g., an automatically driven vehicle or a normal vehicle, has entered the zone $Z_n$.

In the automated highway system (AHS), when an automatically driven vehicle from the previous zone $Z_{n-1}$, enters to the zone $Z_n$, the vehicle-roadside communication (a vehicle ID, the running conditions of the vehicle and the like) between the vehicle and the roadside communication terminal 110(i) starts via the LCX $105_n$. At this time, the running distance which has been calculated in the vehicle is reset. Thus, the running distance calculated in the vehicle corresponds to the distance from the position of the vehicle entrance sensor to a running position of the vehicle.

Returning to FIG. 12, when it is determined that a vehicle from the previous zone $Z_{n-1}$ has entered the zone $Z_n$ (Yes in S3), it is further determined whether there is a vehicle which starts the communication via the LCX $105_n$ (S4). When there is a vehicle which starts the communication via the LCX $105_n$, the control unit recognizes that the vehicle which has entered the zone $Z_n$ is an automatically driven vehicle. In this case, the control unit further determines whether a catalog of the automatically driven vehicle which has entered the zone $Z_n$ and started the communication is included in catalogs of vehicles which are running in the upstream side zone $Z_{n-1}$ (S5).

Figures 17, 18:
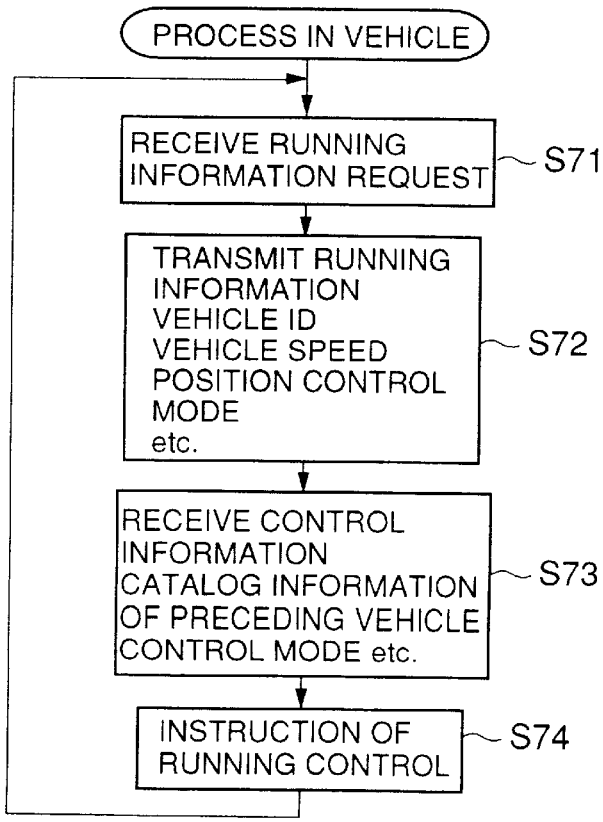
FIG. 17 is a diagram illustrating a catalog describing running conditions of a vehicle which is running in the special lane for the automatically driven vehicles.
FIG. 18 is a flowchart illustrating a procedure of a process performed in a vehicle which communicates with roadside communication terminals (the vehicle-roadside communication) via an LCX.

The catalog described above is a list of information regarding each vehicle. The catalog is formed as shown in FIG. 17. That is, the catalog has information regarding "VEHICLE ID", "VEHICLE SPEED (REAL/ESTIMATION)", "POSITION IN ZONE (REAL/ESTIMATION)", "TYPE OF VEHICLE", "ENTRANCE TIME", "CONTROL MODE", "PRECEDING VEHICLE ID", and "FOLLOWING VEHICLE ID". The "VEHICLE ID" represents information identifying the vehicle. The "VEHICLE SPEED (REAL/ESTIMATION)" represents a vehicle speed which is calculated in the vehicle (REAL) or a vehicle speed which is estimated by the control unit (ESTIMATION). The "POSITION IN ZONE (REAL/ESTIMATION)" represents a position of the vehicle in the zone which is calculated in the vehicle (REAL) or a position in the zone which is estimated by the control unit (ESTIMATION). The "TYPE OF VEHICLE" represents either the automatically driven vehicle or the normal vehicle (not the automatically driven vehicle). The "ENTRANCE TIME" represents a time at which the vehicle from the upstream side zone has entered the zone. The "CONTROL MODE" represents either a platoon running control mode or an ACC (Automatic Cruise Control) mode. In the platoon mode, vehicles which communicate with each other are caused to run in tandem at predetermined intervals. In the ACC mode, the vehicle is caused to run at a constant speed. The "PRECEDING VEHICLE ID" represents information identifying a vehicle which proceeds the vehicle. The "FOLLOWING VEHICLE ID" is information identifying a vehicle immediately behind the vehicle.

Each of the control units corresponding to the respective zones in the control system 500 maintains, in a memory, catalogs of vehicles which are in a corresponding zone. Information of each item of each catalog is updated in accordance with the running state of a corresponding vehicle. The control system 500 manages running states of vehicles which are running in the special lane L1 using the catalogs of the vehicles maintained in the respective control units and the count value of each of counters $C_n$.

Returning to FIG. 12, when it is determined that the catalog of the automatically driven vehicle which has entered the zone $Z_n$ is included in the catalogs of the respective vehicles in the upstream side zone $Z_{n-1}$ (Yes in S5), a corresponding catalog is deleted from the control unit corresponding to the zone $Z_{n-1}$ and a corresponding catalog is created in the control unit corresponding to the zone $Z_n$ (S6). The "POSITION IN ZONE" of the newly created catalog in the control unit corresponding to the zone $Z_n$ is updated to an initial value "0". The "ENTRANCE TIME" of the new catalog is updated based on a time at which the automatically driven vehicle from the upstream side zone $Z_{n-1}$ has entered the zone $Z_n$.

After the catalog of the automatically driven vehicle which has entered the zone $Z_n$ is created as described above, the count value of the counter $C_{n-1}$ indicating the number of vehicles in the upstream side zone $Z_{n-1}$ is decremented by one (−1) (S7). The count value of the counter $C_n$ indicating the number of vehicles in the zone $Z_n$ is then incremented by one (+1) (S8).

On the other hand, when it is determined that a catalog of the automatically driven vehicle which has entered the zone $Z_n$ is not included in the catalogs of the respective vehicles in the upstream side zone $Z_{n-1}$ (No in S5), it is further determined whether vehicle(s) from the lane L2 have entered the upstream side zone $Z_{n-1}$ of the special lane L1 (S9). If vehicle(s) from the lane L2 have entered the upstream side zone $Z_{n-1}$ of the special lane L1, the control unit determines that one of the vehicle(s) is an automatically driven vehicle which has moved from the upstream side zone $Z_{n-1}$ and entered the zone $Z_n$. The count value of the counter $C_{n-1}$ indicating the number of vehicles in the zone $Z_n$ is then decremented by one (−1) (S10). After this, a new catalog of the automatically driven vehicle which has entered the zone $Z_n$ is created (S11). When the automatically driven vehicle passes through the start point of the zone $Z_n$ and enters it, the vehicle ID is transmitted from the vehicle to the roadside communication terminal 100(n) in the vehicle-roadside communication. The vehicle ID, an initial value of the position in the zone $_n$, the entrance time, the preceding vehicle ID, the following vehicle ID and the like are set in the new catalog.

When no vehicle has moved from the lane L2 and entered the upstream side zone $Z_{n-1}$ of the special lane L1, the count value of the counter $C_{n-1}$ is not decremented by one (−1), and a new catalog of the automatically driven vehicle which has entered the zone $Z_n$ is created.

According to the process (S4–S11) as has described above, the control system 500 recognizes that the automatically driven vehicle has entered the zone $Z_n$ and starts the management of the automatically driven vehicle in the zone $Z_n$.

On the other hand, in a case where although it is detected at the start point of the zone $Z_n$ that a vehicle has entered the zone $Z_n$, there is no vehicle which starts the vehicle-roadside communication via the LCX $105_n$ (No in S4), the control unit determines that the vehicle which has entered the zone $Z_n$ is the normal vehicle (not the automatically driven vehicle). The control unit further determines whether the normal vehicle has been managed in the upstream side zone $Z_n$ (a catalog of the normal vehicle has been created) (S12). In the concrete, catalogs of normal vehicles are searched from the catalogs of the respective vehicles in the zone $Z_{n-1}$, and it is determined, based on the information of the catalogs, whether there is a normal vehicle having an estimated position is in a predetermined region located at the trailing end of the zone $Z_{n-1}$.

If the normal vehicle which has entered the zone $Z_n$ has been managed in the upstream side zone $Z_{n-1}$, the catalog of the normal vehicle stored in the control unit corresponding to the zone $Z_n$ is deleted and a new catalog of the normal vehicle is created for the zone $Z_n$ (S13). At this time, a vehicle speed is calculated based on times at which the normal vehicle entered the zone $Z_{n-1}$ and the zone $Z_n$ The calculated vehicle speed is set as the estimated vehicle speed in the new catalog and the entrance time and an initial value of the estimated position in the zone are further set in the new catalog.

After this, the count value of the counter $C_{n-1}$ indicating the number of vehicles in the upstream side zone $Z_{n-1}$ is decremented by one (−1) (S7). The count value of the counter $C_n$ indicating the number of vehicles in the zone $Z_n$ is incremented by one (+1) (S8).

On the other hand, in a case where a normal vehicle which has entered the zone $Z_n$ has not yet been managed in the zone $Z_{n-1}$ (No in S12), the control unit further determines whether there are vehicles which have moved from the lane L2 and entered the zone $Z_{n-1}$ of the special lane L1 (S14). If there are such vehicles, the control unit determines that one of the vehicles is the normal vehicle which has moved from the zone $Z_{n-1}$ and entered the zone $Z_n$. The count value of the counter $C_{n-1}$ is then decremented by one (−1) (S15). After this, a new catalog of the normal vehicle which has entered the zone $Z_n$ is created (S16). At this time, a vehicle ID is provided for the normal vehicle, and the vehicle ID, an initial value of a position in the zone $Z_n$, the type of vehicle (normal vehicle), the entrance time, the preceding vehicle ID and a following vehicle ID are set in the new catalog. The count value of the counter $C_n$ is incremented by one (+1) (S8).

According to the process (S4, S12–S16, S7 and S8) as described above, the control system 500 recognizes that the normal vehicle has entered the zone $Z_n$ and starts the management of the normal vehicle in the zone $Z_n$.

Figure 14:
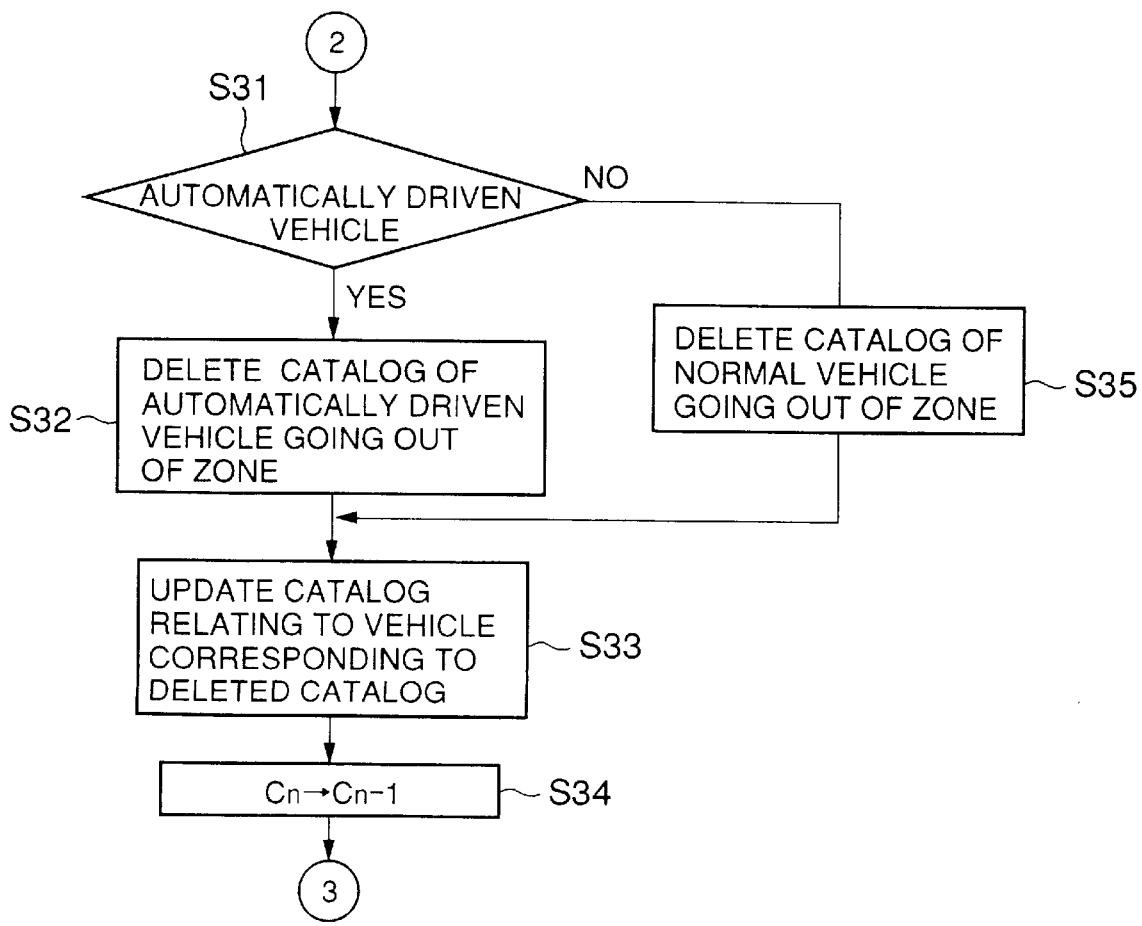
FIG. 14 is a flowchart (No.3) illustrating a procedure of a process in the control unit corresponding to each zone of the special lane for the automatically driven vehicles.

In step S2 shown in FIG. 12, if it is determined that the exit signal is output from the processing circuit 102 of the roadside communication terminal 100 (n) (Yes in S2), that is, if a vehicle has exited the zone $Z_n$ of the special lane L1 and moved to the loan L2, the control unit, corresponding to the zone $Z_n$, of the control system 500 executes a process in accordance with a procedure as shown in FIG. 14.

Referring to FIG. 14, the control unit determines whether the vehicle which has exited the zone $Z_n$ is the automatically driven vehicle (S31). In a case where an automatically driven vehicle exits the zone $Z_n$ and moves to the lane L2, the automatically driven vehicle communicates with the roadside communication terminal via the LCX about the lane change (the vehicle-roadside communication). Thus, when the exit signal is output from the processing circuit 102, it is determined, based on whether or not the vehicle-roadside communication about the lane change is performed, whether the vehicle which has exited the zone $Z_n$ is the automatically driven vehicle.

If the vehicle which has gone out of the zone $Z_n$ and moved to the lane L2 is the automatically driven vehicle, the control unit deletes a catalog of the automatic vehicle (S32). The control unit then retrieves other catalogs which refer to the vehicle ID (identifying the automatic vehicle which has exited the zone $Z_n$) indicated in the deleted catalog. The reference vehicle ID (the preceding vehicle ID or the following vehicle ID) indicated in each of the retrieved catalogs is updated (S33). After this, the count value of the counter $C_n$ indicating the number of vehicles in the zone $Z_n$ is incremented by one (+1) (S34).

On the other hand, if the vehicle which has exited the zone $Z_n$ and moves to the lane L2 is a normal vehicle, the control unit specifies the normal vehicle which has gone out of the zone $Z_n$ based on estimated running positions indicated in catalogs of the normal vehicles and a position of the lane change sensor 110(i) related to the output of the exit signal. A catalog of the specified normal vehicle is deleted (S35). After this, other catalogs which refer to the vehicle ID of the deleted catalog are updated in the same manner as in the above case (S33). The count value of the counter $C_n$ is decremented by one (–1) (S34).

According to the process as described above, the control system 500 terminates the management of the vehicle which has exited the special lane L1 and moved to the lane L2.

Figure 15:
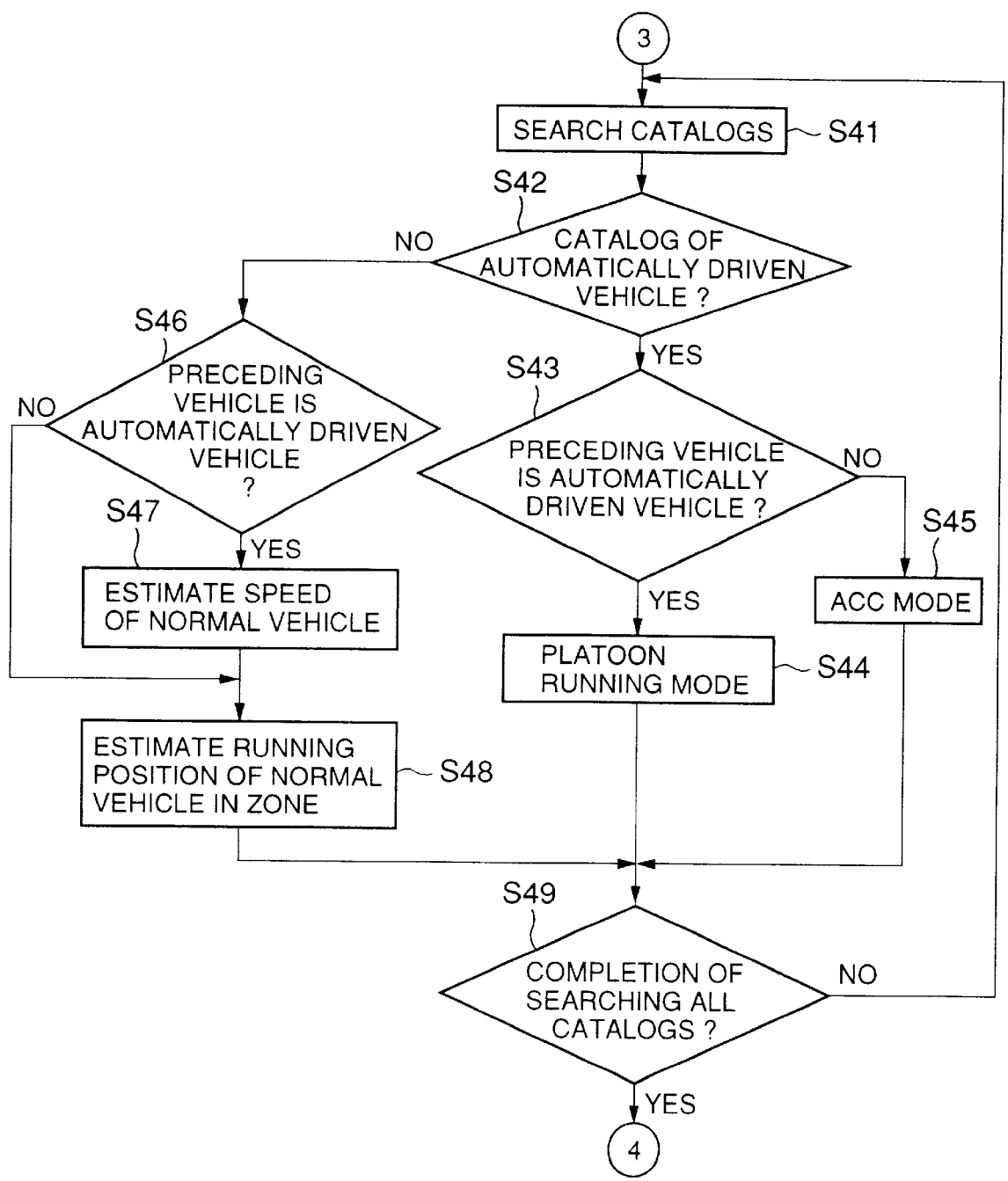
FIG. 15 is a flowchart (No.4) illustrating a procedure of a process in the control unit corresponding to each zone of the special lane for the automatically driven vehicles.

As has been described above, every time a vehicle which has entered the zone $Z_n$ is detected and every time a vehicle which has exited the zone $Z_n$ is detected, the control unit corresponding to the zone $Z_n$ executes a process in accordance with a procedure as shown in FIG. 15. Since the running states of the automatically driven vehicles in the zone $Z_n$ are affected by vehicles which have entered and exited the zone $Z_n$, the process is performed in order to review the control mode of each of the automatically driven vehicle. In addition, the process is performed in order to update the estimated vehicle speed of each of the normal vehicles in the zone $Z_n$.

Referring to FIG. 15, the control unit searches catalogs of the respective vehicles in the zone $Z_n$ (S41). It is determined, based on the information of the "TYPE OF VEHICLE" of each of the searched catalogs, whether each catalog corresponds to an automatically driven vehicle or a normal vehicle (S42). When it is determined that a selected catalog corresponds to the automatically driven vehicle, the control unit retrieves, with reference to the "PRECEDING VEHICLE ID" of the selected catalog, a catalog of a vehicle immediately preceding the automatically driven vehicle. The control unit then determines, with reference to the "TYPE OF VEHICLE" of the retrieved catalog, whether the type of vehicle immediately preceding the vehicle corresponding to the selected catalog is the automatically driven vehicle (S43). If the type of vehicle immediately preceding the vehicle corresponding to the selected catalog is the automatically driven vehicle, the platoon running control mode is set in the "CONTROL MODE" of the selected catalog of the automatically driven vehicle (S44). In the platoon running control mode, the communication with the preceding vehicle about information regarding the running conditions is performed (the vehicle-vehicle communication). Then, based on the information obtained in the vehicle-vehicle communication, the driving control (the acceleration control, the braking control, steering control and the like) of the vehicle (the automatically driven vehicle) is performed so that the vehicle follows the preceding vehicle at a constant interval.

On the other hand, in a case where the type of vehicle immediately preceding the vehicle corresponding to the selected catalog is the normal vehicle, the ACC mode is set in the "CONTROL MODE" of the selected catalog (S45). In the ACC.(Automatic Cruise Control) mode, the driving control (the acceleration control, the braking control and the like) of the vehicle (the automatically driven vehicle) is performed so that the vehicle speed is maintained at a constant value. In this case, the distance between the vehicle and the preceding vehicle is controlled based on detecting signals from a sensor for detecting the preceding vehicle so as to be not less than the predetermined value.

Further, on the other hand, if a selected catalog does not correspond to the automatically driven vehicle (No in S42), the control unit retrieves, with reference to the "PRECEDING VEHICLE ID" of the selected catalog, a catalog of a vehicle immediately preceding the vehicle corresponding to the selected catalog. It is further determined, with reference to the "TYPE OF VEHICLE" of the retrieved catalog, whether the type of vehicle immediately preceding the vehicle (the normal vehicle) corresponding to the selected catalog is the automatically driven vehicle (S46). In a case where the type of the vehicle immediately preceding the normal vehicle is the automatically driven vehicle, the vehicle speed of the normal vehicle is estimated so as to be equal to a value indicated in the "VEHICLE SPEED (REAL)" of the retrieved catalog corresponding to the automatically driven vehicle (S47). That is, the value indicated in the "VEHICLE SPEED (REAL)" of the retrieved catalog corresponding to the automatically driven vehicle is copied into the "VEHICLE SPEED (ESTIMATION)" of the selected catalog corresponding to the normal vehicle.

After this, the control unit estimates a position of the normal vehicle in the zone based on the vehicle speed as estimated above (S48). The estimated value is set in the "POSITION IN ZONE (ESTIMATION)" of the selected catalog corresponding to the normal vehicle. Further, in a case where the type of the vehicle immediately preceding the normal vehicle corresponding to the selected catalog is the normal vehicle (No in S46), the control unit estimates a position of the normal vehicle in the present zone based on the vehicle speed which was estimated when the normal vehicle entered the zone $Z_n$ (see S13 in FIG. 12). Based on the estimated value, the "POSITION IN ZONE (ESTIMATION)" of the selected catalog of the normal vehicle is updated (S48).

After the process as described above is completed, it is determined whether all the catalogs of the vehicles have been completely searched (S49). Until all the catalogs have been completely searched, the processes (S41 through S48) as described above are repeated. When the process for all the catalogs is completed, the control unit starts the process from the step S1 shown in FIG. 12 again.

If no vehicle has entered and exited the zone $Z_n$ (No in each of steps S1, S2 and S3), the control unit executes, in accordance with the procedure as shown in FIG. 15, the process for updating the control mode of each automatically driven vehicle and the estimated vehicle speed of each normal vehicle.

Figure 16:
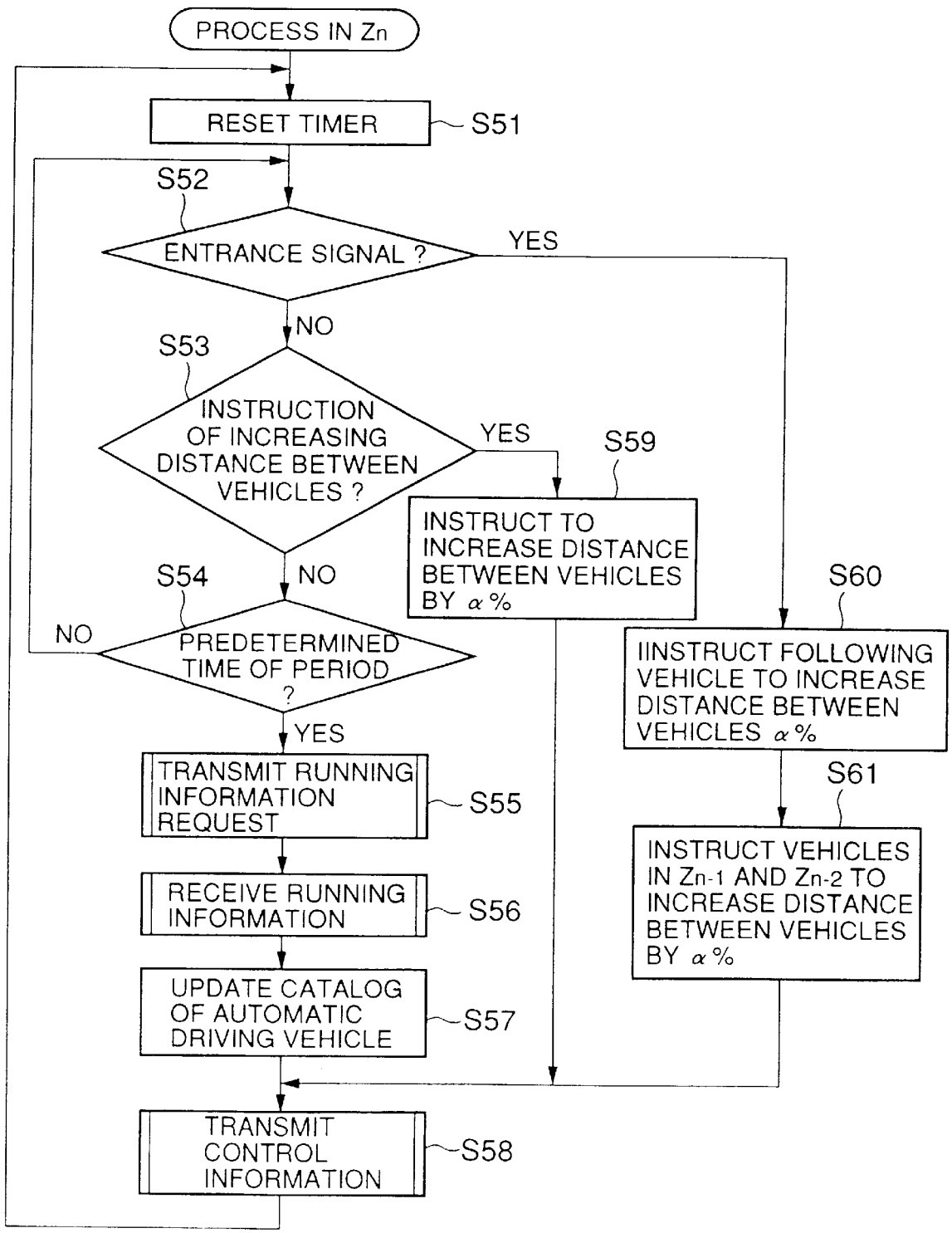
FIG. 16 is a flowchart (No.5) illustrating a procedure of a process in the control unit corresponding to each zone of the special lane for the automatically driven vehicles.

In parallel to the processes (see FIG. 12 through FIG. 15) as described above, the control unit communicates with the respective vehicles in the zone $Z_n$ (the vehicle-roadside communication) and executes an information communication process in accordance with a procedure as shown in FIG. 16. In the vehicle-roadside communication, each of the vehicles carries out a process in accordance with a procedure as shown in FIG. 18.

Referring to FIG. 16, after resetting an internal timer (S51), the control unit repeatedly determines whether the entrance signal is supplied (S52) and whether an instruction for increasing the distance between vehicles is supplied from a control unit corresponding to another zone (S53) for a predetermined time period (S54). If neither the entrance signal nor the instruction from a control unit corresponding to another zone is supplied, the control unit transmits request signals to the respective automatically driven vehicles in the zone $Z_n$ via the LCX $105_n$ (S55).

In each of the automatically driven vehicles the running distance from a position at which the automatic vehicle has entered the zone $Z_n$ (a running position in the zone $Z_n$) is calculated. When each of the automatically driven vehicles receives the request signal from the LCX $105_n$ (S71 in FIG. 18), each of the automatically driven vehicles transmits the vehicle ID and various running information items (S71 in FIG. 18). The running information items include the running position in the zone, the vehicle speed and the control mode in which the driving control is being executed.

When the control unit receives the running information items which are transmitted from each of the automatically driven vehicles (S56 in FIG. 16), the control unit updates the catalog of each of the automatically driven vehicles based on the received running information items (S57 in FIG. 16). That is, the running position of each of the automatic vehicles in the zone and the vehicle speed which are indicated in the catalog are changed to values included in the running information items. The control unit then transmits information regarding the control mode to corresponding each of the automatically driven vehicles via the LCX $105_n$ (S58 in FIG. 16).

Each of the automatically driven vehicles receives the information regarding the control mode via the LCX $105_n$ (S73 in FIG. 18). In each of the automatically driven vehicles, running control instructions based on the received control mode are supplied to respective running control systems (the acceleration control system, the braking control system, the steering control system and the like) (S74 in FIG. 18).

Due to the entrance of an automatically driven vehicle into the zone $Z_n$ of the special lane L1 from the lane L2, the entrance signal is output from the processing circuit 102 of the roadside communication terminal 100 (Yes in S52). In this case, the control unit outputs control information for causing each of automatically driven vehicles behind the vehicle which has entered the zone $Z_n$ to increase the distance between the automatically driven vehicle and the preceding vehicle by $\alpha$ % (S60). The control unit further supplies to control units corresponding to the zones $Z_{n-1}$ and $Z_{n-2}$ which are located at the upstream side of the zone $Z_n$ control information for causing each of automatically driven vehicles in the zone $Z_{n-1}$ and $Z_{n-2}$ to increase the distance between the driving vehicle and the preceding vehicle by $\alpha$ % (S61). The control unit then transmits the control information for increasing the distance between the vehicles to the automatically driven vehicles behind the vehicle which has entered the zone $Z_n$ via the LCX $105_n$.

In each of the automatically driven vehicle which receives the control information described above (S73 in FIG. 18), the distance between the automatically driven vehicle and the preceding vehicle is calculated and the running control is carried out so that the calculated distance is maintained.

In addition, the control unit may receive control information for increasing the distance between the vehicles from the control unit corresponding to a zone $Z_{n+1}$ or $Z_{n+2}$ which is located at the downstream side of the zone $Z_n$ (Yes in S53). In this case, the control unit outputs control information for causing automatically driven vehicles in the zone $Z_n$ to increase the distance between the automatic vehicle and the preceding vehicle by $\alpha$ % (S59). The control information is transmitted to respective automatically driven vehicles via the LCX $105_n$ (S58).

At a time when a vehicle has entered the zone $Z_n$, it can not be recognized whether the vehicle is an automatically driven vehicle or a normal vehicle. Thus, as has been described above, automatically driven vehicles behind the vehicle which has entered the zone $Z_n$ (for example, automatically driven vehicles in two zones located at the upstream side of the zone $Z_n$) are instructed to increase the distance between the automatically driven vehicle and the preceding vehicle. After the vehicle which has entered the zone $Z_n$ enters the next zone $Z_{n-1}$, the running control of the vehicle is performed based on the information of the new catalog of the vehicle and catalogs of other vehicles in the same manner as in the above cases.

The present invention is not limited to the aforementioned embodiments, and other variations and modifications may be made without departing from the scope of the claimed invention.

What is claimed is:

1. A lane change detecting system comprising:

emission means for emitting a predetermined signal, said emission means being provided in a boundary between lanes of a road so that the predetermined signal emitted by said emission means is affected by a mobile body crossing the boundary between the lanes;

receiving means provided in the boundary between the lanes for receiving the predetermined signal emitted by said emission means and outputting a receiving signal corresponding to the received signal; and determination means for determining, based on a state of the output signal from said receiving means, whether a mobile body has crossed the boundary between the lanes.

2. The lane change detecting system as claimed in claim 1, wherein said emission means has a plurality of emission units which are arranged so as to extend in a direction of a width of each of the lanes, each of said plurality of emission units emitting a signal, said receiving means has a plurality of receiving units each of which corresponds to one of said plurality of emission units, each of said plurality of receiving units receiving the signal from a corresponding one of said plurality of emission units and outputting a receiving signal corresponding to the received signal, and said determination means has direction determination means for determining, based on timing of state variations of receiving signals from said plurality of receiving units, a direction in which the mobile body has crossed the boundary between the lanes.

3. The lane change detecting system as claimed in claim 1, wherein the predetermined signal emitted by said emission means is a pulsed laser beam.

4. The lane change detecting system as claimed in claim 3, wherein said determination means has means for detecting an envelope of the receiving signal output from said receiving means which receives the pulsed laser beam and outputting an envelope signal, said determination means determining, based on a waveform of the envelope signal, whether the mobile body has crossed the boundary between the lanes.

5. A mobile body detecting device comprising:

a housing having a first surface and a second surface facing the first surface;

signal emission means which is mounted in said housing for emitting a predetermined signal through the first surface;

receiving means which is mounted in said housing for outputting a receiving signal corresponding to a signal incident to a receiving surface of said receiving means, the receiving surface facing outward through the second surface;

wherein said signal emission means emits a pulsed laser beam as the predetermined signal beam, and an optical axis of the pulsed laser beam emitted by said signal emission means is on a line normal to a center of the receiving surface of said receiving means.

6. The mobile body detecting device as claimed in claim 5, wherein said signal emission means has a plurality of signal output units which output signal beams arranged in parallel to each other, and said signal receiving means has a plurality of receiving units, each of said plurality of receiving units having a receiving surface which faces outward through the second surface.

7. The mobile body detecting device as claimed in claim 6, wherein each of said plurality of receiving units corresponds to one of said plurality of signal output units.

* * * * *